United States Patent [19]

Blasey et al.

[11] Patent Number: 5,189,207
[45] Date of Patent: Feb. 23, 1993

[54] PROCESS FOR THE PRODUCTION OF SOLID OR PASTE-FORM PRODUCTS

[75] Inventors: Gerhard Blasey, Duesseldorf; Christoph Breucker, Wuelfrath; Bernhard Gutsche; Lutz Jeromin, both of Hilden; Guenter Panthel, Haan; Eberhard Peukert, Hilden; Wolfgang Schmidt, Monheim, all of Fed. Rep. of Germany

[73] Assignee: Henkel Kommanditgesellschaft auf Aktien, Duesseldorf-Holthausen, Fed. Rep. of Germany

[21] Appl. No.: 282,073

[22] Filed: Dec. 7, 1988

[30] Foreign Application Priority Data

Dec. 7, 1987 [DE] Fed. Rep. of Germany ....... 3741401

[51] Int. Cl.$^5$ ................... C07C 53/00; C07C 143/52; B01J 2/12; C05C 3/00
[52] U.S. Cl. ........................................ 562/97; 562/45; 562/76; 560/151
[58] Field of Search ............................. 562/97, 76, 45; 260/400; 560/151

[56] References Cited

U.S. PATENT DOCUMENTS

| | | | |
|---|---|---|---|
| Re. 23,774 | 1/1954 | Stoneman | 562/97 |
| 2,613,218 | 10/1952 | Stoneman | 562/97 |
| 2,671,797 | 3/1954 | Hagemann et al. | 562/97 |
| 2,766,276 | 10/1956 | Kolling | 562/97 |
| 2,915,517 | 12/1959 | Le Suer | 562/97 |
| 4,361,965 | 12/1982 | Goumondy et al. | 34/57 |
| 4,788,011 | 11/1988 | Busse et al. | 260/507 |

FOREIGN PATENT DOCUMENTS

| | | |
|---|---|---|
| 0032341 | 7/1981 | European Pat. Off. . |
| 0083122 | 7/1983 | European Pat. Off. . |
| 0139945 | 5/1985 | European Pat. Off. . |
| 2141490 | 1/1973 | France . |
| 2461518 | 2/1981 | France . |
| 707994 | 4/1954 | United Kingdom .................. 562/97 |
| 727669 | 4/1965 | United Kingdom .................. 562/97 |

OTHER PUBLICATIONS

Chemical Abstract equiv. to FR 2,461,518 (CA No. 95:186086x).
Chemical Abstract equiv. to FR 2,141,490 (CA No. 79:116529q).

Primary Examiner—Arthur C. Prescott
Assistant Examiner—Vivian Garner
Attorney, Agent, or Firm—Ernest G. Szoke; Wayne C. Jaeschke; Henry E. Millson, Jr.

[57] ABSTRACT

A process for the production of solid or paste-form products by fast reactions is carried out stoichiometrically wherein a gaseous medium is introduced into each of the reactants to be reacted with one another, the reactant streams formed are combined and are subsequently forced through a spray unit in a weight ratio of gaseous medium to product stream of from 0.04 to 0.3 (kg/kg) and at a rate of 0.1 to 15 m/second, as calculated from the gas-free reactant streams and based on the free cross-section of the spray unit. The products obtained are free from readily volatile constituents.

11 Claims, No Drawings

PROCESS FOR THE PRODUCTION OF SOLID OR PASTE-FORM PRODUCTS

BACKGROUND OF THE INVENTION

1. Field of the Invention

This invention relates to a process for the production of solid or paste-form products by reaction of stoichiometric quantities of several reactants in a fast reaction and spraying of the reaction products in a spray unit.

2. Statement of Related Art

Typical examples of fast chemical reactions are the neutralization of acids, the saponification of esters, and alkylation reactions, particularly alkylations of tertiary amines.

Neutralization reactions of sulfonic acids or fatty acids take place spontaneously. Problems in the conduct of the reaction can arise when the reactants, i.e., acids and alkalis, are immiscible with one another and/or when the neutralization product formed is a solid or paste-form product. In cases such as these, the quality of the neutralization is determined by the intensity with which the reactants are mixed and/or by the intensity with which the reaction mixture is intermixed.

On an industrial scale, the neutralization of sulfonic acids to washing-active sulfates or sulfonates takes place discontinuously in neutralization vessels or continuously in recirculation systems. In the latter case, the sulfonic acid is introduced together with the alkali into already neutralized product with intensive mixing by stirrers, centrifugal pumps and static mixing elements, the ratio of recirculation volume to freshly added sulfonic acid and alkali being in the range of from 10:1 to 20:1. In the neutralization of hydrolysis-sensitive products, such as sulfuric acid semiesters of fatty alcohols and fatty alcohol ethers, consistently good intermixing and blending of the neutralization mixture have to be carried out to rule out product losses. Both with discontinuous operation and with continuous operation, heat exchange elements have to be used to dissipate the heat of reaction in order to prevent overheating of the product.

Neutralization products containing around 60% by weight washing-active substance (WAS) can be produced by this process. Most of the remaining 40% by weight consists of water which has to be removed, for example by spray drying, during incorporation of the washing-active sulfates/sulfonates in powder-form detergents.

A reduction in the water content to reduce energy consumption during drying is desirable and can sometimes be achieved by the use of relatively highly concentrated alkalis in the neutralization reaction.

Simple material balances show that neutralization products containing around 80% washing-active substance and around 20% water can be produced in the neutralization of sulfonic acids with 50% sodium hydroxide. In addition, the energy balance of the neutralization reaction shows that around 40 to 50% of the water formed during the neutralization reaction and the water introduced into the reaction mixture with the 50% sodium hydroxide can be evaporated with the heat of reaction. Where 50% sodium hydroxide is used, therefore, neutralization products containing around 90% washing-active substance and only around 10% water are theoretically formed, the heat of reaction being utilized for drying. Under these conditions, the neutralization products of sulfonic acids based on fatty alcohol and fatty acid esters may readily be processed to free-flowing powders. By utilizing the heat of reaction, however, other unwanted volatile substances can also be removed from the products. Reduction of the dioxane content of fatty alcohol ether sulfates is an example of this.

However, the industrially used process described above for the neutralization of sulfonic acids does not allow the use of highly concentrated alkalis because the reaction product or neutralization product becomes increasingly more viscous and, ultimately, paste-like with increasing content of washing-active substance. Beyond a content of around 60% by weight washing-active substance, sulfates/sulfonates can no longer be pumped and uniform blending and intermixing of the reaction components and the reaction mixture, respectively, and safe dissipation of the heat of reaction are no longer manageable.

The production of soaps by the neutralization of fatty acids is comparable with the neutralization of sulfonic acids for the production of washing-active sulfates/sulfonates. In this case, however, the neutralization reaction is complicated, and not only by the paste-like flow behavior of the soap formed during the reaction. Since the aqueous alkalis and the fatty acids are not soluble in one another, a correspondingly high degree of dispersion is necessary to establish a sufficiently large mass transfer surface between the two liquid phases and, hence, a sufficiently high reaction velocity. Conventional processes for the production of soap base from fatty acids may be divided into two process steps, namely:

1. combining, homogenizing or emulsifying the reactants insoluble in one another and carrying out the neutralization or saponification reaction in stirred vessels, reaction columns or loop reactors;
2. multistage drying of the soap base with an active-substance content of around 60% to 80%.

Like the neutralization of sulfonic acid with alkalis, the neutralization of fatty acids with alkali is a spontaneous reaction, provided the two reactants insoluble in one another can be combined in sufficiently finely dispersed form. The reaction can be started at room temperature, with the reaction mixture or rather the reaction products then undergoing intense heating.

As in the neutralization of sulfonic acids, the material and energy balances for the neutralization of fatty acids show that, where 50% sodium hydroxide is used, it is possible to produce soap base containing around 80% active substance and around 20% water in a single process step.

Instead of pure fatty acids, fatty acid methyl esters may also be reacted to soaps by saponification with sodium hydroxide. In this reaction, methanol is formed as a secondary product and has to be removed from the soap base or toilet soap. This is generally done by evaporation or stripping with steam. The processes used for the production of soaps from methyl esters correspond to the processes for the production of soaps from fatty acids, although involving an additional process step, namely the removal of methanol. In contrast to the neutralization of fatty acids, the reaction velocity in the saponification of methyl esters depends to a large extent on the reaction temperature. Whereas the saponification reaction progresses only slowly at room temperature, it is greatly accelerated by relatively high temperatures (for example 100° C.). It takes place almost instantaneously provided the methyl ester and the alkali can be brought into contact in finely dispersed form at 130° to 140° C.

European Patent Application No. 083 122 describes a process in which two streams of reactants respectively consisting of acid and alkali and, independently thereof, a gas stream are delivered to a spray nozzle, with the neutralization reaction between the sprayed reactants taking place after leaving the nozzle. The mass ratio between gas and reactants is of the order of 0.4. However, the process can only be operated within narrow parameters if a high degree of neutralization is to be achieved and blockage of the spray nozzles is to be prevented. In addition, this known process requires nozzles of complicated construction with a plurality of concentric bores for the separate delivery of reactants and gaseous medium.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to a process which requires only spray units of simple construction, which can be operated with widely variable outputs (for example 1.5 to 200 kg/h product for one of the nozzles used in the process according to the invention), and which is substantially trouble-free in operation because blockage of the spray unit is avoided.

According to the invention, these objects are achieved by the addition of a gaseous medium to each of the separate reactant streams, optionally after heating; the reactant streams are then combined, and finally are forced through the spray unit at a rate of 0.1 to 15 m/sec., as calculated from the gas-free reactant streams and based on the free cross-section of the spray unit, the masses of reactants and gaseous medium being gauged in such a way that a weight ratio of gaseous medium to product stream of 0.04 to 0.3 (kg/kg) is obtained. The quantity of gaseous medium added to each reactant stream is controlled in such manner that, normally, equal quantities of gaseous medium are added to each reaction stream.

The process according to the invention can be applied anywhere where solid or paste-form products are formed in the course of fast chemical reactions, as for example in the neutralization of acids, particularly carboxylic acids, sulfuric acid semiesters, and sulfonic acids, and in the saponification of esters, for example lower alkyl esters of fatty acids, particularly to the corresponding alkali salts using concentrated aqueous alkalis. The process according to the invention is also suitable for the production of alkali salts, more especially the sodium salt, of monochloroacetic acid and for the production of quaternary ammonium compounds by alkylation of tertiary amines, for example with alkyl halides. The process according to the invention is particularly preferred for use in the production of solid, free-flowing washing-active products.

Solid or paste-form, washing-active products which may be produced in accordance with the invention include inter alia the neutralization products of alkyl aryl sulfonic acids, α-sulfofatty acid esters and fatty acids, the sulfuric acid semiesters of alkoxylated, more especially ethoxylated, fatty alcohols and phenols and sulfosuccinic acid, and the saponification products of fatty acids, particularly fatty acid methyl esters. The neutralization or saponification is preferably carried out with concentrated aqueous alkalis, for example with sodium hydroxide containing around 50% by weight NaOH. Gases inert to the reactants and reaction products, such as air, nitrogen, and steam, are particularly suitable as the gaseous medium. Steam is used particularly when the reactant streams or one of the reactant streams is/are to be heated before being combined. The distance between the point at which the gas-treated reactant streams are combined and the spray unit depends upon the process conditions and material systems and should be kept as small as possible. It may readily be determined by the expert in simple tests; it is merely important to ensure that the nozzle is not blocked by premature neutralization or saponification reactions.

In the context of the invention, aqueous alkalis are understood in particular to be the hydroxides, carbonates, and hypochlorites of sodium and potassium in aqueous solution or suspension, and also mixtures thereof. With the hypochlorites, it is possible at the same time to obtain a bleaching effect desirable for many products.

The upper limit to the velocity of the combined reactant streams, based on the free cross-section of the spray unit, is determined by the sonic velocity of the gas and the adjusted ratio of gas mass flow to product mass flow, the calculation being based on the gas-free reactant streams.

Through the addition of a gaseous medium into the reactant streams before they are combined, the process according to the invention is independent of the type and construction of the particular spray nozzles used. Spray neutralization or saponification in a simple tube is even possible. To achieve thorough mixing and to obtain a fully neutralized, homogeneous product, higher mass ratios between gaseous medium and product stream are necessary where spraying is carried out using a tube than where it is carried out using nozzles which are also normally used for spraying liquids. Suitable nozzles are, for example, hollow cone, solid cone, and flat jet nozzles with corresponding swirl elements or swirl slots or with a tangential inlet into a swirl chamber.

Suitable nozzle types and particulars of their dimensions can be found in the relevant literature, for example in K. Chaster, Spray Drying Handbook, John Wiley & Sons, New York, 1979.

The dimensions of the nozzle opening are dependent on the required throughput.

The process according to the invention is particularly suitable for the production of solid, free-flowing washing-active products, preferably for the production of washing-active alkali sulfates or sulfonates. Reactant streams, particularly acid streams, containing a solution or suspension of buffers are preferably used for this purpose. The type of buffers used are known to those skilled in this art on the subject of hydrolysis-sensitive surfactants.

In another advantageous embodiment of the invention, sodium perborate is added as buffer for the production of products which have to be bleached to improve their color, particularly fatty acid (lower) alkyl ester sulfonates; this buffer also acts as a bleach, thereby eliminating the need for a separate process step.

In another advantageous embodiment of the invention, the heat of neutralization or the energy which has to be introduced into the saponification of esters is utilized to evaporate the water of reaction and the water generally introduced through the aqueous alkalis, so that solid, free-flowing washing-active products can be obtained. In addition, the heat of neutralization or rather the energy mentioned above can be used to completely remove low-boiling solvents, for example methanol, which is present or formed in the reaction system.

According to one particularly advantageous feature of the process according to the invention, products having dioxane contents below 200 ppm, based on the solids content, are obtained in the production of fatty alcohol ether sulfates by neutralization of sulfuric acid semiesters of fatty alcohol ethoxylates with aqueous alkalis.

The process according to the invention is also suitable for the production of alkali salts of substituted fatty acids by neutralization or for the production of quaternary ammonium compounds by alkylation of the corresponding tertiary amines, particularly with alkyl halides.

Through the process of the invention, the reactants are intensively mixed while they are being combined and the reaction mixture is finely dispersed immediately after the intensive mixing by spraying through a nozzle. The mixing and fine dispersion can be effected by the kinetic energy of the reactants (flow velocity) and by the potential energy of the reaction mixture (pressure). Both are promoted by the gaseous medium to be added. The addition of the medium to the reactants before they are combined prevents the formation of relatively large product units during the combination phase. This enhances the necessary micromixing of the reactants and simplifies the following spraying step.

In the case of exothermic reactions, as for example in the neutralization of sulfonic acids and fatty acids, the gaseous medium, in addition to intensifying the mixing process, also serves to dissipate the heat of reaction and to reduce the reaction temperature. If, on the other hand, a relatively high reaction temperature is necessary to increase the reaction velocity to achieve high conversions under the conditions of a spraying process, the gaseous medium can also be preheated in addition to the reactant streams, and can be used to establish the necessary reaction temperature by direct heat exchange with the reaction medium. The hydrolysis of fatty acid methyl esters with concentrated aqueous alkalis is an example of this. The addition of the gaseous medium to the reactant streams enables spraying to be carried out at low pressures, even where paste-like or solid products are formed. The performance of the nozzle can be varied by simple changes in the volume streams of the gaseous medium.

In the practical application of the process according to the invention, the reactants stored in the appropriate storage tanks are introduced in stoichiometrically dosed quantities using piston pumps into an unmodified commercially available nozzle or spray tube. The gaseous medium is introduced into the reactant streams before the reactants are combined immediately before the nozzle. In the neutralization of sulfonic acids and fatty acids, air or nitrogen at room temperature is used as the gaseous medium. The basic hydrolysis of the methyl ester can take place using nitrogen at room temperature for the methyl ester and for the alkali, using superheated steam (150°-160° C.) as the gaseous medium.

The reaction temperature can be directly controlled through the mass or volume flows of the reactants and the temperature thereof. In addition, the reaction temperature can be influenced by the mass or volume flow of the gaseous medium and the temperature thereof.

Adjustment of the pH value of the product in the technically interesting range (pH 7 to pH 9) is complicated by the very small quantities and residence times of the reactants in the nozzle and by the marked dependence of the pH value on the mass ratio between acid and concentrated aqueous alkalis. For example, a slight reduction in the quantity of alkylbenzenesulfonic acid used (by 1%) leads to an increase in the pH value from pH 4 to pH 11.

By addition of buffers, such as citric acid and, in particular, sodium perborate (buffer effect of boric acid), a distinct flattening of the neutralization curve is obtained through the buffer effect.

If, for example, 6% sodium perborate is added to alkyl benzenesulfonic acid and the resulting suspension delivered to the nozzle, variations in the reactant streams of 2% only produce changes in the pH values between 7 and 9.

The low mass ratio between auxiliary and product is of advantage in the process described herein. Mass ratios of 0.3 kg and, in particular, of less than 0.3 kg gaseous medium per kg end product are sufficient to achieve very thorough mixing and to obtain a fully neutralized, homogeneous spray product in the production of a fully neutralized product in the neutralization of sulfonic acids. Table 1 below shows the operating conditions where different nozzle types and nozzle diameters are used in the neutralization of alkyl benzenesulfonic acid with 50% sodium hydroxide solution.

TABLE 1

Operating conditions in the neutralization of alkyl benzenesulfonic acid

| Nozzle type | Bore diameter [mm] | Pressure before nozzle [bar] | Product velocity [m/s]* | Ratio of gas to product mass flow (kg/kg) |
|---|---|---|---|---|
| 30° hollow | 1.2 | 8.8 | 7.1 | 0.08 |
| cone nozzle | 1.2 | 10.7 | 15.0 | 0.07 |
| (Schlick | 2.7 | 2.8 | 1.4 | 0.10 |
| Model 100/200) | 2.7 | 6.9 | 6.9 | 0.05 |
|  | 3.4 | 2.8 | 0.9 | 0.09 |
|  | 3.4 | 5.7 | 4.4 | 0.04 |
|  | 5.0 | 3.1 | 1.1 | 0.08 |
|  | 5.0 | 4.1 | 2.0 | 0.04 |
| Tube | 3.0 | 6.9 | 1.5 | 0.20 |
| " | 3.0 | 9.7 | 2.7 | 0.19 |
| " | 6.0 | 2.7 | 0.4 | 0.23 |
| " | 6.0 | 4.9 | 1.4 | 0.15 |
| Annular gap | $d_a = 5.0\ d_i = 3.0$ | 5.5 | 0.8 | 0.29 |
| (Schlick | $d_a = 5.0\ d_i = 3.0$ | 9.4 | 3.1 | 0.13 |

TABLE 1-continued

| | | | Ratio of gas to |
| Nozzle type | Bore diameter [mm] | Pressure before nozzle [bar] | Product velocity [m/s]* | product mass flow (kg/kg) |
|---|---|---|---|---|
| Model 942) | | | | |

*based on the free cross-section of the nozzle orifice

The process according to the invention is illustrated but not limited by the following Examples. A nozzle of the model 942 type made by Schlick with the dimensions shown in Table 1 was used.

EXAMPLES

In the following Examples the gas added to the product streams is divided equally between them.

Example 1

Spray neutralization of alkyl benzenesulfonic acid (ABS)

| Starting materials: | ABS (basis $C_{12/14}$), m approx. 60 kg/h, t approx. 60° C. |
| --- | --- |
| | sodium hydroxide containing 50% by wt. NaOH, t approx. 40° C. |
| | spraying pressure: 4.5 bar |
| | $N_2$-demand: 2 m³/h |
| Spray product (quantities in % by weight): | |
| WAS: | 84.8 |
| US: | 1.6 |
| $Na_2SO_4$ | 0.8 |
| $H_2O$: | 11.5 |
| pH value: (1% solution based on WAS) | 9.6 |
| Klett color value: (5% solution, based on WAS, 4 cm cell, blue filter no. 42) | 59 |

Example 2

Spray neutralization of fatty alcohol sulfonic acid (FAS)

| Starting materials: | FAS (basis $C_{12/16}$), m approx. 60 kg/h, t approx. 60° C. |
| --- | --- |
| | sodium hydroxide containing 50% by wt. NaOH, t approx. 40° C. |
| | spraying pressure: 4.5 bar |
| | $N_2$-demand: 2 m³/h |
| Spray product (quantities in % by weight): | |
| WAS: | 71.2 |
| US: | 8.6 |
| $Na_2SO_4$: | 6.3 |
| NaCl: | 0.1 |
| $H_2O$: | 12.6 |
| pH value: (1% solution based on WAS) | 9.5 |
| Klett color value: (5% solution, based on WAS, 4 cm cell, blue filter no. 42) | 63 |

Example 3

Spray neutralization of fatty acid methyl ester sulfonic acid (MES)

| Starting materials: | MES (basis $C_{16/18}$), m approx. 20 kg/h, t approx. 80° C. |
| --- | --- |
| | sodium hydroxide containing 48% by wt. NaOH, t approx. 40° C. |
| | spraying pressure: 8.5 bar |
| | $N_2$-demand: 2 m³/h |
| Spray product (quantities in % by weight): | |
| mono: | 52.3 |
| di: | 27.7 |
| mono + di: | 80.0 |
| US: | 6.4 |
| $Na_2SO_4$: | 6.2 |
| water: | 10.3 |
| pH value: (1% solution based on WAS) | 9.0 |
| Klett color value: (5% solution, based on WAS, 4 cm cell, blue filter no. 42) | 305 |

Example 4

Spray neutralization of fatty alcohol ether sulfonic acid (FAES)

| Starting materials: | FAES (basis $C_{12/14}$; 2 mol EO) containing approx. 380 ppm dioxane, t approx. 30° C. |
| --- | --- |
| | sodium hydroxide containing 50% by wt. NaOH, t approx. 30° C. |
| | spraying pressure: 5 bar |
| | $N_2$-demand: 2 m³/h |
| Spray product (quantities in % by weight): | |
| WAS: | 77.2 |
| US: | 3.8 |
| $Na_2SO_4$: | 1.2 |
| $H_2O$: | 9.4 |
| dioxane: | under 200 ppm |
| pH value: (1% solution based on WAS) | 10.1 |
| Klett color value: (5% solution, based on WAS, 4 cm cell, blue filter no. 42) | 37 |

Example 5

Spray neutralization of fatty acid

| Starting materials: | palmitic acid, m approx. 60 kg/h, t 70° C. |
| --- | --- |
| | sodium hydroxide containing 42% by wt. NaOH, t 40° C. |
| | spraying pressure: 3.5 bar |
| | $N_2$-demand: 2 m³/h |
| Spray product (quantities in % by weight): | |
| Na soap: | 69.9 |
| $H_2O$: | 26.8 |
| palmitic acid: | 0 |
| pH value: (1% solution, Na soap) | 9.7 |

Example 6

Saponification of fatty acid methyl esters

| Starting materials: | $C_{14}$ methyl ester, m 30 kg/h, t 125° C. |
| --- | --- |
| | sodium hydroxide containing 50% by wt. NaOH, t 110° C. |
| | spraying pressure: 6.5 bar |
| | $N_2$-demand: 1 m³/h (for the $C_{14}$ methyl ester) |

-continued

| | |
|---|---|
| steam demand: 1 m³/h (for the sodium hydroxide) nozzle temperature (preheating 150° C.) | |
| Spray product (quantities in % by weight): | |
| Na soap: | 86.6 |
| H₂O: | 13.7 |
| C₁₄ methyl ester: | 0.1–0.2 |
| methanol | 2.0 |
| pH value: (1% solution, Na soap) | 9.3 |

We claim:

1. In a process for the production of solid or pasteform products by the reaction of about stoichiometric quantities of reactants in separate reactant streams in a fast reaction and spraying of the reaction products in a spray unit, the improvement wherein a gaseous medium is added to each of the separate reactant streams, the reactant streams are then combined, and the combined reactant streams are forced through the spray unit at a rate of from about 0.1 to about 15 m/second, as calculated from the gas-free reactant streams and based on the free cross-section of the spray unit, and wherein the weight ratio of the reactants and the gaseous medium is controlled to produce a weight ratio of gaseous medium to product stream of from about 0.04 to about 0.3 (kg/kg).

2. The process of claim 1 wherein the reactant streams are heated prior to the addition of the gaseous medium thereto.

3. The process of claim 1 wherein there are two reactant streams, one of which is comprised of at least one fatty acid or fatty acid ester, and the other is comprised of a concentrated aqueous alkali.

4. The process of claim 1 wherein the process produces a solid, free-flowing washing-active product.

5. The process of claim 4 wherein the process produces a washing-active alkali sulfate or sulfonate.

6. The process of claim 5 wherein one of the reactant streams contains a buffer.

7. The process of claim 6 wherein the buffer is sodium perborate.

8. The process of claim 1 wherein the product is obtained substantially free from low-boiling solvents.

9. The process of claim 1 wherein the process produces a fatty alcohol ether sulfate having a dioxane content of less than 200 ppm, based on solids content, by the neutralization of a sulfuric acid semiester of a fatty alcohol ethoxylate with an aqueous alkali.

10. The process of claim 1 wherein one reactant stream comprises monochloracetic acid and a second reactant stream comprises a concentrated alkali metal hydroxide.

11. the process of claim 1 wherein the process produces an alkylated tertiary amine.

* * * * *